United States Patent [19]

Hosac

[11] 4,069,592
[45] Jan. 24, 1978

[54] SLOPE MEASURING AND INDICATION MEANS AND THE LIKE

[76] Inventor: Steven W. Hosac, 4809 Arden Way, Carmichael, Calif. 95806

[21] Appl. No.: 645,690

[22] Filed: Dec. 31, 1975

[51] Int. Cl.² ............................................. G01C 9/28
[52] U.S. Cl. ........................................................ 33/387
[58] Field of Search ................. 33/365, 374, 375, 376, 33/384, 385, 386, 387, 388, 338

[56] References Cited

U.S. PATENT DOCUMENTS

| 808,862 | 1/1906 | McCain | 33/387 |
|---|---|---|---|
| 945,275 | 1/1910 | Heistad | 33/374 |
| 1,026,579 | 5/1912 | Hauke | 33/374 X |
| 1,410,491 | 3/1922 | Matoba | 33/375 X |
| 1,587,981 | 6/1926 | Newmyer | 33/374 X |
| 1,765,060 | 6/1930 | Angelis | 33/385 |
| 2,304,313 | 12/1942 | Misz | 33/386 |
| 2,521,525 | 9/1950 | Krausser | 33/376 |

FOREIGN PATENT DOCUMENTS

| 827,831 | 5/1938 | France | 33/386 |
|---|---|---|---|
| 846,938 | 9/1960 | United Kingdom | 33/338 |

Primary Examiner—Charles E. Phillips
Attorney, Agent, or Firm—Mark C. Jacobs

[57] ABSTRACT

A light weight direct reading inclinometer which can be operated by one man, is easily portable and has a scale readout in both percent slope and inches per foot of slope. The normal operating range is within zero to ten percent slop of inclination and can be extended by the use of accessories and/or adjustment mechanisms. Measurements are made by adjusting a pivotally positioned level vial whose movement is interconnected with an adjustable readout wheel mechanism.

15 Claims, 10 Drawing Figures

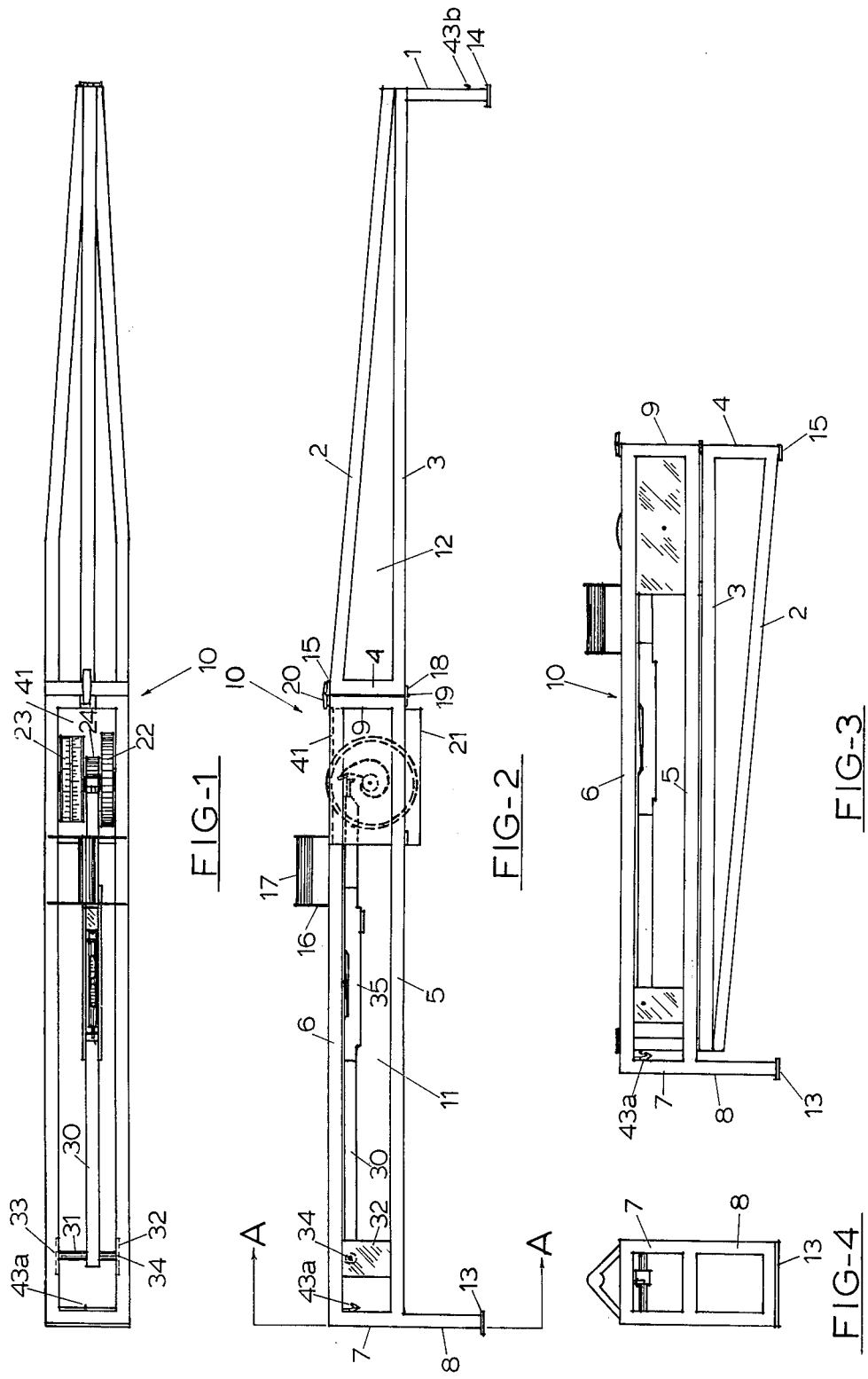

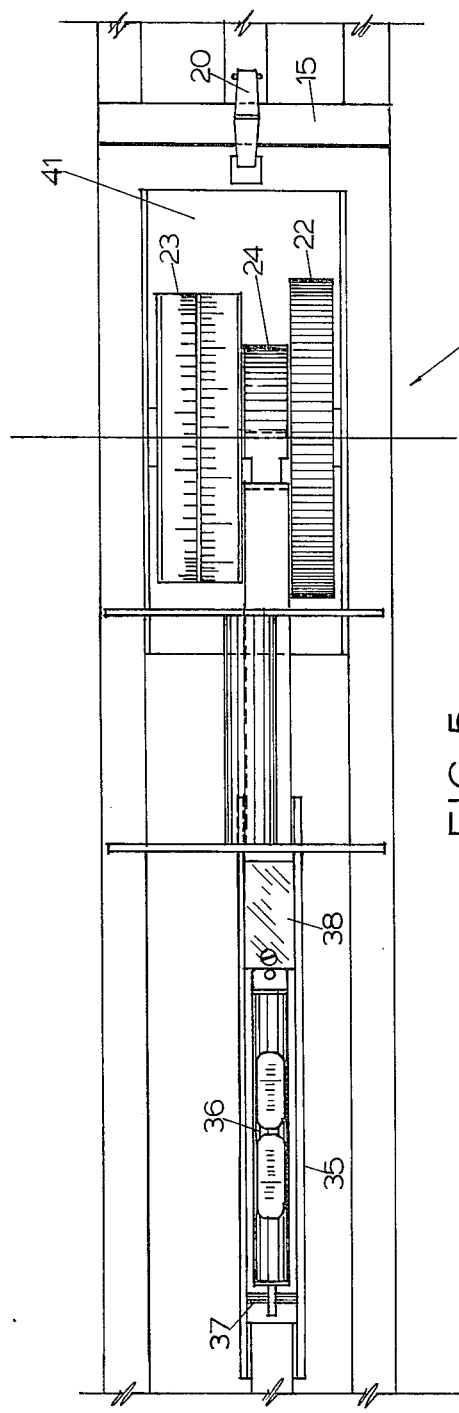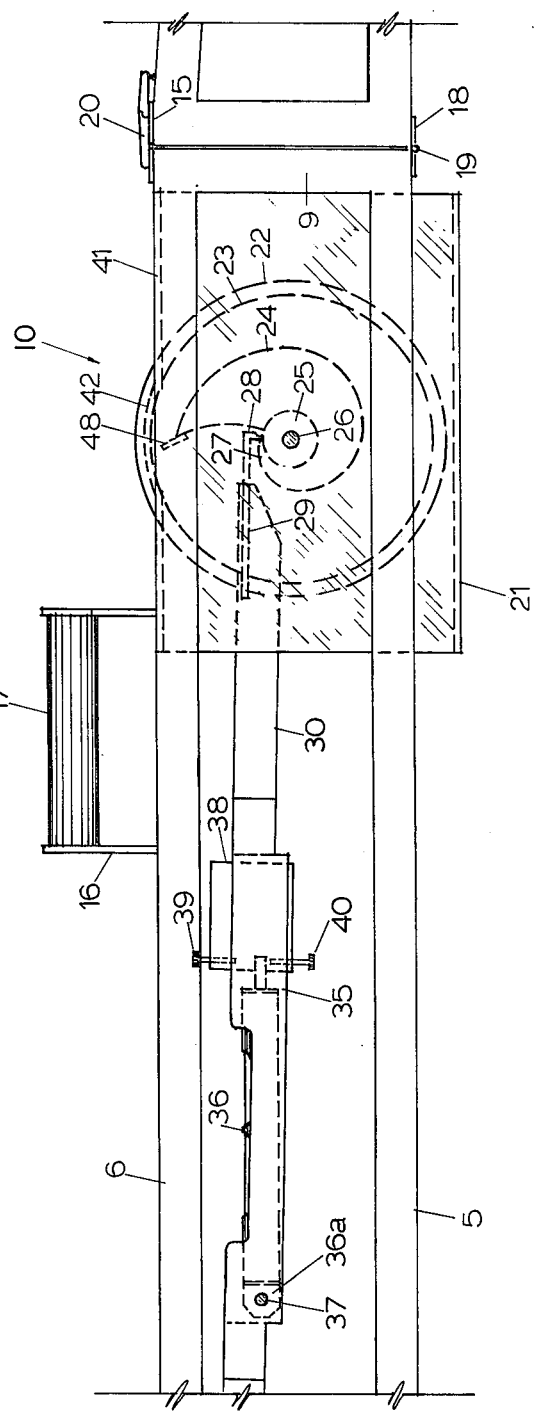

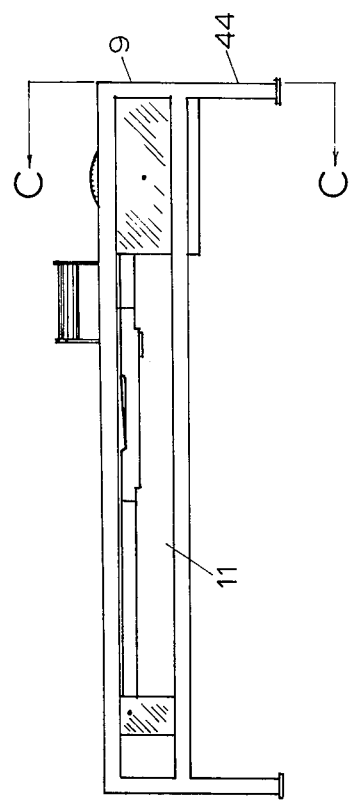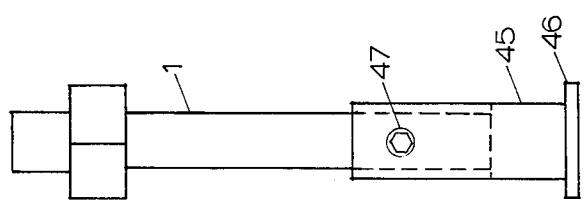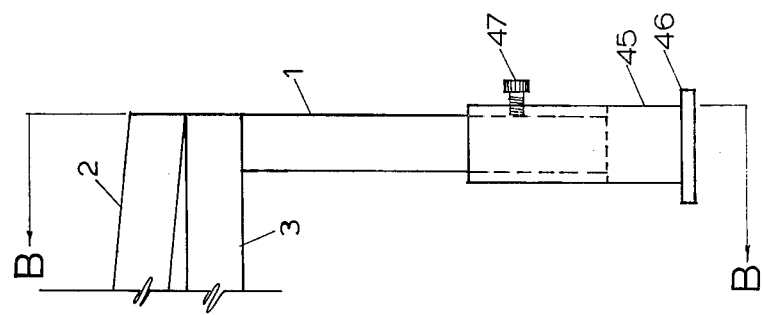

SLOPE MEASURING AND INDICATION MEANS AND THE LIKE

BACKGROUND OF THE INVENTION

The building of roads is a science that has existed for hundreds of years. Men smoothed down dirt for roadbeds and later MacAdam invented a roadbed material which bears his name. During the course of paving of roads, and driveways and other areas wherein cementitious materials are employed, it is often necessary to determine the slope of the incline of such road or path. Spirit levels and slope indicators have existed in the prior art for determining such slope measurements. One such slope indicator is one particularly adopted for use with railroad tracks. Name that of Misz, as disclosed in U.S. Pat. No. 2,304,313. Spirit levels and grading levels are employed for the determining of a level line between different points or any rise or fall between spaced points. The inventor is aware of U.S. Pat. Nos. 808,862 and 1,805,004 which are invented for inclination measurement. In the construction of modern day physical improvements it often becomes necessary to determine or establish certain values of inclination of slope for various elements that comprise the improvement. For example, in the construction of buildings inclination values must be established for roofs, sloping floors, ramps, sidewalks, and drain pipes etc. In the construction of pavement areas such as highways, airports, and parking lots it is customary to the art to shape the various pavement surfaces to certain values of inclination as may be specified by various governing regulations and design. Hereto a slope indication means may be employed.

It is believed that there are no devices in the prior art which are capable of providing inclination values with the same accuracy and sensitivity, length of span between points of measurement, total range of inclination measurement, and versability that the device of this application provides.

It has been found, that due to the inability of workmen to quickly and accurately determine slopes and grades on the job while work is in progress that final slopes and grades often do not meet specified regulations and design. This can result in poor drainage of pavement areas, rough riding highways, pipes, sidewalks and roofs which do not slope properly, etc. In addition, many hours and expense required of expensive survey crews who are commonly hired to gather topographical data can be saved since spot checking of slopes and grades by one person utilizing the device of this invention would provide sufficient data.

Currently available spirit levels, such as Starratt ® number 133 series have a flat base plate of only about one foot in length. It is difficult to measure accurately, inclination average values over long distances, in view of the short length of the item employed. Most other engineers and paving contractor's levels similarly have a flat sole plate extending the length of the instrument, said sole plate being of one to two feet in length.

In contrast however, the invention of this application does not have a flat sole plate, but legs at both ends such that an average value can be taken to compensate for minor inconsistencies over short spatial intervals. In addition, the device of this invention can measure slope over a larger span of distance. In one embodiment, the standard length is 6 feet of span distance. By a simple folding step the unit converts from the 6 foot standard length to a 3 foot length for slope measurement in more compact areas.

Accuracy, sensitivity, durability and simplicity are extremely important in an adjustable spirit level of any kind, for in many instances the inclination values to be dealt with are very small and the instrument will likely be subjected to rough treatment.

SUMMARY OF THE INVENTION

It is an object therefore of this invention to provide an engineering instrument for sensitive slope and grade measurement that can save time, manpower and operating costs. Another object is to provide an almost universally applicable device for the engineer or contractor to quickly and accurately measure slopes and grades in all types of construction work.

It is a further object to provide an apparatus which either alone or in adapted form may be employed for the measurement of the inclination of railroad tracks.

Since accuracy and sensitivity are very important in the measurement of slopes, field calculations of a mathematical nature should be avoided. It is therefore a further object of this invention to provide a direct reading slope indicator with readout in both percent slope and inches per foot in increments of one tenth of one percent and one thirty-second of an inch per foot or finer as required.

Since an extended range is deemed beneficial, it is an object of the invention to provide a device with a range of up to 20 percent inclination.

All of the above benefits can be derived from the subject device which is light in weight, foldable, and easily transported and used by one person.

In brief, a device is provided wherein inclination measurement is determined by the movement of a cam rider on a spiral cam, the adjustment of said spiral cam is interlinked to a readout mechanism and further, wherein the spiral cam rider is interconnected to a level vial whereby the level position is determined by the rise and fall of the cam rider.

The invention accordingly comprises the features, of construction, combination of elements, and arrangement of parts, which will be exemplified in the construction herein recited, the scope of which will be indicated in the claims. For a fuller understanding of the nature of the invention, reference should be had to the following detailed description taken in connection with the accompanying drawings wherein similar reference numerals refer to like parts throughout the several views of the drawings.

BRIEF DESCRIPTION OF THE DRAWINGS

FIG. 1 is a top plan view of the slope measuring device of my invention.

FIG. 2 is a vertical elevation view of the device of FIG. 1.

FIG. 3 is a vertical elevation view of the device of FIGS. 1 and 2 but shown in the folded position.

FIG. 4 is a vertical end view of the device of FIGS. 1 and 2 taken along Section line A-A as indicated in FIG. 2.

FIG. 5 is an enlarged partial view of a portion of the device as shown in FIG. 1.

FIG. 6 is an enlarged partial view of a portion of the device as shown in FIG. 2.

FIG. 7 is an enlarged partial vertical view of front end support member 1 as shown in FIG. 2 showing an accessory leg inserted and attached thereon.

FIG. 8 is a vertical end view of the modified device of FIG. 7 taken along Section line B-B as indicated in FIG. 7.

FIG. 9 is a vertical elevation view of the device of FIG. 2 shown in its optional configuration with no front extension section.

FIG. 10 is a vertical end view of the device of FIG. 9 taken along Section line C—C as indicated in FIG. 9.

DESCRIPTION OF THE PREFERRED EMBODIMENT

Referring now to FIGS. 1 through 4 of the drawings, a slope indicating device 10 is shown having a two-piece housing comprised of housing sections 11, 12 hinged at hinge 18. A releasable latch 20 may be secured to one of the sections, as section 11, releasably engaging the other section, as section 12, for locking the sections 11, 12 together in the extended position. It is to be understood that hinge 18 may include a removable hinge pin 19 (FIG. 6) or hinge 18 itself may be removable so that section 12 may be separated from section 11 or never attached to section 11 as may be desired, for reasons to be discussed.

Sections 11 and 12 may be made of any suitable materials, such as square aluminum or magnesium tubing or rod stock.

Referring again to FIGS. 1 through 4, a single front foot or support member 1 is secured to the forward end of section 12 and a U-shaped rear foot or support member 8 is secured to the rear end of section 11. Optional replaceable and abrasion resistant sole plates 13 and 14 may be attached to the bottom of support legs 1 and 8 respectively. Likewise, a similar replaceable and abrasion resistant sole plate 15 may be attached to leg 4 as shown, said leg 4, when employed, becoming the front support surface when device 10 is in the folded position (FIG. 3). As can be seen in FIG. 2 the section 12 top member 2 is sloped or inclined from releasable latch 20 to support member 1. A handle 17 is secured between a pair of parallel handle brackets 16 which are provided on the upper surface of each tube of member 6 of section 11. Brackets 16 are mounted between the balance point of device 10 when extended and the balance point of device 10 when in its folded position and said handle is positioned equidistant between each long tube of member 6.

As can be seen in FIGS. 2 and 6, section 11 is comprised of interconnected top and bottom members 6, 5, interconnected by end members 7, 9. A "U" shaped housing section 21 is provided between members 5, 6 adjacent end member 9.

As can further be seen in FIG. 2, section 12 is comprised of interconnected top and bottom members 2 and 3 by end (leg) member 4. Foot support 1 is appended at a right angle to member 3 and downward therefrom. Optional sole plate 14 may be removably situated on support 1.

As particularly contemplated in the present invention, device 10 is adapted to measure simultaneously the inclination of a slope in both precent or inches per foot or in other convenient measurements such as in metric units. In the exemplary embodiment of the invention, "U" shaped housing section 21 includes spiral cam 24, knurled control wheel 22, scale readout wheel 23, supporting shaft 25, and shaft bolt 26 for carrying out the foregoing. A pair of support plates 32, 33 (FIGS. 1 and 2) are secured between members 5, 6 near end member 7. A shaft 31 is secured to control arm 30 and shaft 31 is pivotally fixed to support plates 32, 33 via shaft bolt 34. Control arm 30 therefore is pivotally connected at the rear end and extends between members 5, 6 and into housing section 21. A cam rider stylus 29 is attached to the free end of control arm 30 extending into housing section 21. A sensitive conventional level vial 36 (FIGS. 5 and 6) is mounted within level vial saddle 35 said level vial saddle 35 being part of control arm 30. Level vial 36 is pivotally attached at the rear of saddle 35 via bolt 37 inserted through an opening in vial extension 36A. The front end of level vial 36 is attached to level vial adjustment mechanism 38 which is mounted at the front of saddle 35. Level vial adjustment mechanism 38 (FIG. 6) is utilized for initial calibration adjustment setting of level vial 36 by suitable manipulation of adjusting screws 39, 40. Adjusting screws 39, 40 may also be utilized for adjusting level vial 36 to predetermined settings other than the initial calibration setting. The latter adjustment may be utilized as one method of increasing the total slope measuring range of device 10. This is accomplished by adjusting level vial 36 with adjusting mechanism 38 such that the slope readings from scale wheel 23 are increased or decreased by a fixed and predetermined value from a known slope measurement, whereby the total slope measuring range can be increased.

Level vial 36 is also associated with arm 30 between members 22 and 23, and thus movable with arm 30.

As can be seen in FIGS. 5 and 6, a knurled control wheel 22 is journaled for rotation on a shaft 25 fixed within housing section 21 by shaft bolt 26. A slope scale readout wheel 23 is also secured to shaft 25 so that when control wheel 22 is rotated, scale wheel 23 is also automatically rotated in a like manner. A spiral cam 24 is also fixedly secured to shaft 25 for rotation therewith. As can be seen in FIG. 6, stylus 29 includes a tip 28 which moves along the camming surface of spiral cam 24. If desired a Plexiglas ® cover 41 affixed with a transparent bubble 42 or the like, magnified or unmagnified, with appropriate reference corss-lines may be provided for reading the numbers and divisions on scale readout wheel 23 as shown in FIG. 6 a striker plate 48 may be provided on the tip of cam 27 to prevent override of the stylus 28 beyond the maximum point, thereby protecting the stylus from injury.

In operation, device 10 may be folded by releasing latch 20 and rotating section 12 down and under until it cradles within section 11 as shown in FIG. 3. Section 12 is held in the cradled position within section 11 via spring held releasable hood and latch 43A and 43B. Device 10 can be utilized to measure slopes in either the extended (FIGS. 1 and 2) or the folded (FIG. 3) position.

When extended, device 10 is supported on the sloping surface to be measured by resting it on support legs 1, 8 and when folded is supported on support legs 8, 4. As indicated previously optional sole plates 13, 14 and 15 may be employed. Knurled control wheel 22 is then rotated with stylus tip 28 riding along interconnected spiral cam 24 until control arm 30 is raised to a point where the bubble, not shown or numbered in the drawings, in level vial 36 is centered. The slope of the surface being measured can then be read directly on the slope scale readout wheel 23 by reference to a fixed grid line marked on transparent raised dome 42.

Slope scale readout wheel 23 may be sectioned or otherwise provided with numbers and division lines to read slope measurements in both percent inclination of the slope being measured or in inches per foot of the slope being measured. Other units of measure such as metric units may also be included. The slope measuring mechanism in the whole is extremely sensitive and the slope inclination may be read directly to within one tenth of one percent and one thirty-second inches per foot or finer increments of measurement can be obtained if desired.

As indicated, device 10 may be made of aluminum, such as from ¾ inch square aluminum tubing with heli-arc welded joints. Device 10 may be completely anodized for corrosion and stain resistance. Device 10 may also be painted with a compatible coating if desired.

As shown in FIGS. 9 and 10, device 10 may be optionally manufactured for use without section 12. In this embodiment "U" shaped leg 44 is secured in axial alignment with and as a continuation of member 9. Leg 44 is positioned at right angle to section 11 and parallel to leg 8. This embodiment is for use where measurements in a shorter configuration may be required as in more confined areas.

As shown in FIGS. 7 and 8, an accessory extension leg 45 with abrasion resistant sole plate 46 may be inserted onto single leg support member 1. Thus, extension 45 may be generally tubular and of similar configuration to support 1, to receive therein support member 1 as indicated by the dotted line in FIGS. 7 and 8. Screw 47, of Allen or other type is used to removably secure said extension to said leg 1. Accessory legs for use with the embodiment of FIG. 9 for attachment to support 44 are contemplated but not shown. The operation of and the benefits of accessory legs will be described in detail infra.

The support legs 1, 8 (8,4 in folded position) and 8, 44 of FIG. 9 embodiment, with or without accessory legs, enable device 10 to measure the actual slope between the surface contact points of said support legs thus compensating for minor inconsistencies in the topography or surface of the pipe, concrete etc., over the short spacial interval between the support legs.

In the embodiments of both FIG. 9 and FIG. 2, as well as when accessory legs are employed, the operation of the spiral cam is the same. The spiral cam 24 changes its radius along a given fixed reference radial as it is rotated. As spiral cam 24 is rotated on the axis of shaft 25, the stylus point 28 of stylus 29 rides on the spiral camming surface 27 and rises or falls depending on the direction of rotation. The bubble in level vial 36, fixed to stylus 29 via level vial saddle 35 and control arm 30 is thus brought to the centered position and the slope of the surface being measured is read directly on the scale readout wheel 23. The spiral cam 24 thus continuously and uniformly changes its radius along a given fixed reference radial as it is rotated through an entire 360° revolution. The numbers and division lines on the slope scale readout wheel 23 are thus seen to be distributed over the entire 360° circular surface of wheel 23. As a result, device 10 enables very small changes in radius of cam 24, caused by slight rotation of same, to be transformed into relatively large circumferencial movements of the surface of scale readout wheel 23. Thus it is possible to mark the surface of scale readout wheel 23 with very small increments of slope change with increment markings (division lines and numbers) not spaced too close together or crowded as to be difficult to read. As can be appreciated from the forgoing, extremely sensitive and small increments of slope change can be measured with device 10 and these sensitive and small increments of slope change are easily read from the slope scale readout wheel 23.

Device 10 can measure the slope inclination of any surface in units of both percent slope and inches per foot slope. Device 10 can measure slopes direct without the use of accessories to a total range of 0 to 10 percent slope and 0 to 1 and three-sixteenths inches per foot. This direct range is also extendable by use of accessories as described earlier. The range of measurement can also be changed by modifying the length of the control arm and modifying the size of the cam in accordance with the formulae set forth below. Obviously the housing will have to be changed to accomodate these changes. As previously indicated the range of the embodiment of FIG. 2 can be increased by the use of accessory foot 45. When the leg is affixed in place, the range is increased a predetermined fixed increment, relative to the height of the accessory leg 45. Thus, if a leg of stated length is used such that the level reads zero when inserted, this zero reading is actually the maximum available from the unit without the accessory. Further, it is seen that if the range of the instrument is set at 5 percent maximum measurement, then a 3 percent reading with the accessory in place, is actually an 8 percent reading. Leg extensions for the embodiment of FIG. 9 would increase the measurable slope in like manner.

In summary, the device 10 is positioned on a sloping surface with the front or member 1 pointing preferably downslope. The knurled control wheel 22 is then rotated by applying slight rotational pressure with thumb or fingers thereto. As wheel 22 is caused to rotate, the spiral cam 24 and scale readout wheel 23 are also caused to rotate since they are mounted on common shaft 25. As spiral cam 24 rotates, its radius as measured from the center of shaft 25 to the surface of spiral cam 24 continuously and uniformly changes along any given fixed reference radial line. The cam rider or stylus tip 28 is in free contact with the camming surface 27 of spiral cam 24 directly above and along the vertical centerline of the shaft 25. Thus, as spiral cam 24 is rotated, control arm 30 is raised and lowered at the front and pivots at the rear on shaft bolt 34. As spiral cam 24 is rotated in a positive direction, the front of control arm 30 is raised to a point where the bubble in level vial 36 becomes centered. At this setting, the scale readout wheel 23 has been rotated to the correct position for determination of the surface slope being measured and the actual slope of the surface is determined by visual reference to indicia on said wheel 23, e.g., graduations and numbers on same. A determination of the correct reading on scale readout wheel 23 is made from a line marked on the transparent dome 42 to provide a fixed reference indication.

The length of the control arm 30, the location of the control arm pivot point 31, the sensitivity of the level vial 36 and the calibration adjustment of the level vial 36 in the control arm 30, the radius of the slope scale readout wheel 23, the radius and change of radius per any given rotational increment of the spiral cam 24, the point at which the cam rider stylus 28 comes in contact with the spiral cam 24, the spacing and arrangement of slope readout graduations and numbers on the scale wheel 23, the total possible range of direct slope measurement and the sensitivity and accuracy of the slope measurement are all mathematically inter-related and may be designed and specified through the use of several various mathematical formulae and principles. Any one element of length, radius, arrangement and/or location etc., of any of the components in slope measuring device 10 cannot necessarily be changed or modified without also necessitating corresponding change or adjustments of the other components of device 10. This is due to the mathematical and physical interrelationship of the slope measuring mechanism components as stated above.

Device 10 is also easily transported, or stored in the folded (FIG. 3) position. It can be appreciated that device 10 may be relatively long in overall length, such as each section being about 3 feet long, or a total of 6 feet in length, when extended, so that larger areas may be measured accurately or device 10 may be relatively short such as 3 feet in length, when folded, such that measurements may be obtained in shorter or more compact areas. Since device 10 may be constructed of aluminum or other light-weight materials, it can easily be carried in either the extended or the folded position via handle 17.

The following mathematical formulae and relationships may be used in developing the required physical and mathematical interrelationships as discussed hereinabove.

1. Spiral Cam 24

The general formula used in the development of the spiral cam 24 is that analytic geometry formula which applies to the standard Archimedian Spiral except as modified herein. The standard formula for the Archimedian Spiral is a polar equation and is expressed as follows:

$$r = a\theta$$

where:
- $r$ = radius distance from centerline of spiral cam shaft to spiral cam surface of any given angular rotation.
- $a$ = constant radius change per given incremental change of $\theta$
- $\theta$ = angle of rotation in degrees The standard Archimedian Spiral formula given above may be modified slightly in the development of the spiral cam 24 and thus this formual may be modified to read as follows:

$$r = a\theta + c$$

where:
All letters have the same representation as defined in the above formula and "c" equals a constant, this constant being the initial radius or starting radius of the spiral cam 24, this radius being further defined as the distance from the centerline of the main shaft 25, the spiral cam is mounted on to the initial or starting radius of the spiral cam 24.

2. Slope, Distance, and Change of Elevation Formulae

The following formulae apply to the length of the control arm 30 along with the change in slope of the control arm 30 and the change of elevation of the end of the control arm 30 which rests on the spiral cam 24 with any given rotational increment of the spiral cam 24. These formulae also apply to the change in elevation between the two ends of the framework of device 10 with any given slope and length of the framework.

a. $S = \Delta E/D$
b. $D = \Delta E/S$
c. $\Delta E = DS$ where:
- $S$ = Slope from the horizontal in decimal form
- $D$ = Actual horizontal distance between any two points
- $E$ = Change of actual elevation between any two points caused by a given slope and horizontal distance between the same two points 3. Level Vial 36

The following formulae were used to determine the required level vial sensitivity which is required to provide the proper sensitivity and precision of the slope measuring device 10:

$$(0.0000581) \times (S) = I$$

$$(17241.38) \times (I) = S$$

where:
- $S$ = Seconds sensitivity per space (level vial)
- $I$ = Inches elevation per foot (Slope) 0.0000581 and 17241.38 = physical constants These formulae are known to apply to conventional vials, as vial 36.

4. Tangential Offset Formula

The following formula may be used to determine the error caused by the fact that the control arm cam rider or tip 38 does not remain precisely above the exact vertical centerline of the spiral cam 24 as the cam rider or tip 28 is raised and lowered by rotation of the spiral cam 24. This is a result of the fact that the cam rider or tip 28 prescribes the arc of a circle as it is raised and lowered.

$$x = \Delta E^2/2D$$

where:
- $x$ = Tangential offset distance — the slight horizontal distance the cam rider or tip 28 moves as it is raised and lowered.
- $\Delta E$ = Vertical distance the cam rider to tip 28 is raised or lowered
- $D$ = Length of control arm 30 from centerline of rear pivot to cam rider contact point 5. Slope Indicator Scale Wheel Graduation Spacing Formulae The following formulae may be used to determine the layout and spacing of the graduations and divisions on the slope readout scale wheel.

a. $c = \pi D$
b. $S = \pi r\theta/180$ where:
- $c$ = Outer circumference of scale readout wheel 23
- $\pi$ = Physical constant (3.14159265)
- $D$ = Diameter of scale readout wheel or wheel 23
- $S$ = Arc length between scale wheel 23 graduation and division spacing with any given rotational increment
- $r$ = Radius of scale readout wheel 23
- $\theta$ = Rotational increment of scale readout wheel 23 in degrees It can be seen from the forgoing that suitable mathematical formulae and relationships are presented for determining the various mathematical and physical inter-relationships the various control mechanism components have with one another.

In the construction of highway pavement areas the device of this invention will measure highway longitudinal and cross slopes, superelevations, shoulders, bridge decks, ramps, intersections, transitions, etc. Similarly, in the construction of parking lot pavement areas the device of this invention will measure valley and ridge line slopes, driveways, gutters, curbs, and sloping areas surrounding drainage inlets, etc. In the construction of buildings the device of this invention can be used to measure the slope of sloping roofs, ramps, floors, sidewalks, etc.

Since certain types of construction work, and particularly in plumbing and related applications, it is often necessary to lay pipes and conduit in such a way that the piping will have a uniform rate of fall or pitch with respect to the horizontal in order that the liquid contents of the pipe will tend always to be moved by gravity in one direction at uniform rate and often times this piping or conduit is positioned in such locations as to make sighting along the pipe impractical or impossible. The device of the instant invention can be employed to insure that the pitch or the fall is uniform and as specified in the design throughout the length of the piping.

It is believed that this invention provides the practioner with a practical and beneficial slope measuring capability which has not heretofore been available to the art. It is to be understood that various modifications and variations of the foregoing invention may be considered by the skilled artisan and that the details and description set forth herein are to be limited only by the apended claims.

I claim:

1. In a slope measuring device for measuring the inclination of a surface, said device having a housing, a control arm pivotally mounted at one end of said housing, the other end being free and non-suspended, and extending into said housing, a level vial mounted in said control arm, the improvement in said device comprising
    a. a rotatable cam mounted in said housing, and having a peripheral spiral surface contacting the free end of said control arm,
    b. a rotatable control wheel interconnected with both said arm and said spiral cam for continuously changing the radius of said spiral cam,
    c. a slope scale readout wheel marked off in a type of indicia for measuring inclination and interconnected to said rotatable wheel, said control means, said spiral cam and said slope scale readout wheel being rotatable together on a common axis shaft, said cam, said readout wheel and said control means, all being disposed in said housing, said common axis shaft being aligned in a plane perpendicular to the length of said control arm, wherein said housing includes a pair of foldable sections, said control arm, said vial, said cam, said wheels, and said control means being mounted in the first of said two sections, hinging means mounted between the first section and the second section for folding the second section, and the second of said two sections being removably secured to said first section; said sections, when extended, providing an elongated housing for slope measurement and, when folded, providing a folded housing slope measurement device, wherein said first section includes support means at one end and said second section includes a support means at one end thereof, and the support means of said first section is an inverted generally U-shaped member providing a space therein and the said second section support means is an elongated member movable into the space in said inverted U-shaped member, when said second section is in its folded position.

2. In the device of claim 1 a hinging means secured to both of said sections for removably securing said second section to said first section.

3. In the device of claim 1 including a plurality of latching means secured to both of said sections for latching said sections both in the extended position and in the folded position.

4. In the device of claim 1 wherein the housing comprises a first section, having said control arm, vial, cam, and said wheels mounted therein, and said first section is provided with support means at both ends of said section.

5. In the device of claim 4 including a carrying handle on said first section, said handle being located approximately between the balance point of said housing when in its extended position and the balance point of said housing when one section is folded back onto the other.

6. In the device of claim 1 wherein the end of said second section having a support leg thereon includes a generally tubular accessory leg for selectively receiving said support leg therein and said accessory leg is of a length greater than said first mentioned support leg and is for use in conjunction therewith, thereby increasing the slope measurement capability.

7. In a slope measuring device for measuring the inclination of a surface, said device having a housing, a control arm pivotally mounted at one end of said housing, the other end being free and non-suspended, and extending into said housing, a level vial mounted in said control arm, the improvement in said device comprising
    a. a rotatable cam mounted in said housing, and having a peripheral spiral surface contacting the free end of said control arm,
    b. a rotatable control wheel interconnected with both said arm and said spiral cam for continuously changing the radius of said spiral cam,
    c. a slope scale readout wheel marked off in a type of indicia for measuring inclination and interconnected to said rotatable wheel, said control means, said spiral cam and said slope scale readout wheel being rotatable together on a common axis shaft, said cam, said readout wheel and said control means, all being disposed in said housing, said common axis shaft being aligned in a plane perpendicular to the length of said control arm, wherein said housing includes a pair of foldable sections, said control arm, said vial, said cam, said wheels, and said control means being mounted in the first of said two sections, hinging means mounted between the first section and the second section for folding the second section, and the second of said two sections being removably secured to said first section; said sections, when extended, providing an elongated housing for slope measurement, and, when folded, providing a folded housing slope measurement device, wherein said first section includes support means at one end and said second section includes a support means at one end thereof, and wherein said first section comprises a pair of spaced apart parallel members, and said second section support means is an elongated member movable into the space between said parallel members of said first section when the device is in a folded position.

8. The device of claim 7 further including an accessory leg removably secured to the support leg of said second section.

9. In the device of claim 7, a hinging means secured to both of said sections for removably securing said second section to said first section.

10. In the device of claim 7, including a plurality of latching means secured to both of said sections for latching said sections both in the extended position and in the folded position.

11. The device of claim 7 further including a carrying handle.

12. In a slope measuring device for measuring the inclination of a surface, said device having a housing, a control arm pivotally mounted at one end of said housing, the other end being free and non-suspended, and extending into said housing, a level vial mounted in said control arm the improvement in said device comprising
   a. a rotatable cam mounted in said housing, and having a peripheral spiral surface contacting the free end of said control arm,
   b. a rotatable control wheel interconnected with both said arm and said spiral cam for continuously changing the radius of said spiral cam,
   c. a slope scale readout wheel marked off in a type of indicia for measuring inclination and interconnected to said rotatable wheel, said control means, said spiral cam and said slope scale readout wheel being rotatable together on a common axis shaft, said cam, said readout wheel and said control means, all being disposed in said housing, said common axis shaft being aligned in a plane perpendicular to the length of said control arm, and said control arm has a stylus tip at its free end contacting said spiral cam's peripheral surface and movable in contact therealong, wherein said spiral cam's peripheral surface terminates in a point, and said point has a breaker plate mounted thereon for limiting the rotation of said tip.

13. In the device of claim 12 where all of said indicia on said scale readout wheel are calibrated to the rotation of said spiral cam, said scale readout wheel having a circular surface and said indicia extending a full three hundred and sixty degrees about the periphery of said scale readout wheel whereby a uniform and positive movement of the control arm occurs through a full 360° rotation of the spiral cam and the scale readout wheel.

14. The device of claim 12, further including a carrying handle.

15. The device of claim 12 further including an accessory leg secured to the support leg of said second section.

* * * * *